(12) United States Patent
Martin et al.

(10) Patent No.: US 8,880,046 B2
(45) Date of Patent: Nov. 4, 2014

(54) IMAGE SELECTION FOR AN INCOMING CALL

(71) Applicant: Apple Inc., Cupertino, CA (US)

(72) Inventors: Timothy B. Martin, Sunnyvale, CA (US); Gregory Charles Lindley, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/710,350

(22) Filed: Dec. 10, 2012

(65) Prior Publication Data

US 2013/0143537 A1 Jun. 6, 2013

Related U.S. Application Data

(63) Continuation of application No. 12/872,331, filed on Aug. 31, 2010, now Pat. No. 8,331,916.

(51) Int. Cl.
 *H04W 4/14* (2009.01)
 *H04M 1/57* (2006.01)

(52) U.S. Cl.
 CPC .................................. *H04M 1/576* (2013.01)
 USPC .......................... 455/415; 455/412.2; 455/566

(58) Field of Classification Search
 USPC ............. 455/415, 412.1, 412.2, 414.1, 550.1, 455/566; 379/88.21, 142.04, 142.06, 379/142.08, 142.17
 See application file for complete search history.

(56) References Cited

U.S. PATENT DOCUMENTS

| | | | |
|---|---|---|---|
| 8,355,698 B2 * | 1/2013 | Teng et al. ............... | 455/411 |
| 2005/0190904 A1 | 9/2005 | Anupam et al. | |
| 2007/0121821 A1 | 5/2007 | Su | |
| 2008/0158385 A1 | 7/2008 | Lee et al. | |
| 2008/0176599 A1 | 7/2008 | Kim | |
| 2008/0300010 A1 * | 12/2008 | Border et al. ............... | 455/556.1 |
| 2009/0221321 A1 | 9/2009 | Fields et al. | |
| 2009/0268888 A1 | 10/2009 | Hsu et al. | |
| 2009/0290697 A1 | 11/2009 | Adams | |
| 2010/0075712 A1 * | 3/2010 | Sethuraman et al. ...... | 455/556.1 |
| 2010/0114822 A1 * | 5/2010 | Pollock et al. ................. | 707/623 |
| 2010/0248703 A1 | 9/2010 | Mears et al. | |
| 2010/0255890 A1 * | 10/2010 | Mikkelsen et al. ........... | 455/567 |
| 2010/0317332 A1 * | 12/2010 | Bathiche et al. ............. | 455/418 |
| 2011/0106912 A1 * | 5/2011 | Onda et al. .................... | 709/217 |

FOREIGN PATENT DOCUMENTS

EP 1761003 A1 3/2007

OTHER PUBLICATIONS

Authorized Officer Jacques Reichert, Notification of Transmittal of the International Search Report and the Written Opinion of the International Searching Authority in International Application No. PCT/US2011/048768 mailed Dec. 2, 2011, 13 pages.

* cited by examiner

*Primary Examiner* — Cong Tran
(74) *Attorney, Agent, or Firm* — Fish & Richardson P.C.

(57) ABSTRACT

Methods, systems, and apparatus, including computer programs encoded on a computer storage medium, are described for selecting an image of a caller associated with an incoming call. In one aspect, a method includes identifying a caller associated with an incoming call from an originating telecommunications device. The method also includes locating plurality images of the identified caller, and randomly displaying on the mobile telecommunications device's display screen one or more images from among the located plurality images of the identified caller.

28 Claims, 5 Drawing Sheets

IMAGE SELECTION FOR AN INCOMING CALL

CROSS-REFERENCE TO RELATED APPLICATIONS

This application is a continuation of U.S. application Ser. No. 12/872,331, filed Aug. 31, 2010, the entire contents of which are incorporated by reference herein.

BACKGROUND

This specification relates to image selection for an incoming call, for example, by randomly selecting one or more images from a plurality of images depicting the caller. Under some circumstances, an image of a given person can be associated with an address book entry for the given person. Moreover, the address book may be associated with a telecommunications device. The device sometimes presents the image of the given person when a phone call from the given person is being received by the device.

SUMMARY

This specification describes technologies relating to image selection for a caller associated with an incoming call. Specifically, the described technologies relate to randomly selecting an image of the caller from among a pool of caller's images that are stored across one or more libraries of digital images. Prior to the random selection, the pool of caller's images can be filtered based on predetermined criteria relating to, e.g., a geo-location of the originating call, a recent event involving the caller, and the like.

In general, one aspect of the subject matter described in this specification can be implemented in methods that include the actions of identifying a caller associated with an incoming call from an originating telecommunications device. The methods also include locating plurality images of the identified caller, and randomly displaying on the mobile telecommunications device's display screen one or more images from among the located plurality images of the identified caller.

These and other implementations can include one or more of the following features. In some implementations, locating can include searching a first image database located on the mobile telecommunications device. In some implementations, locating can include searching a second image database located on a remote server system. In some implementations, locating can include searching the World Wide Web.

In some implementations, locating can include queering an image database based on an identifier of the identified caller. The identifier can include one or more of an identifier of the originating telecommunications device, a name of the identified caller, and a nickname of the identified caller. In some implementations, locating can include matching images from an image database with an image of the identified caller associated with a contact database.

The methods can further include filtering the located plurality images of the identified caller, and then, randomly displaying one or more images can include randomly selecting the one or more images to be displayed from among the filtered plurality images of the identified caller. In some implementations, filtering can include selecting images from among the located plurality of images that have a ranking higher than or equal to a predetermined ranking. In some implementations, filtering can include selecting images from among the located plurality of images that show the identified caller together with an owner of the mobile telecommunications device. In some implementations, filtering can include selecting images from among the located plurality of images that have been displayed earlier than a predetermined time interval. In some implementations, filtering can include selecting images from among the located plurality of images that have been displayed less than a predetermined number of times.

In some implementations, filtering can include selecting images from among the located plurality of images that are part of image sets satisfying a given image set criterion. For example, an image set can include corresponding images relating to an associated event. As another example, an image set can include corresponding images relating to a location of the originating telecommunications device. As another example, an image set can include corresponding images acquired during a daytime similar to a daytime of the incoming call.

Furthermore, the methods can include assigning respective confidence levels to the located plurality images of the identified caller. Randomly displaying one or more images can include randomly selecting the one or more images to be displayed from among the located plurality images of the identified caller that have respective confidence levels higher than or equal to a predetermined confidence level.

In some implementations, randomly displaying can include rendering portions of the one or more images, respectively, each of the portions including a face of the identified caller. In some implementations, randomly displaying can include displaying a different image for each consecutive alert of the incoming call.

In some other implementations, the located plurality images of the identified caller can include video clips of the identified caller. Moreover, randomly displaying can include randomly selecting a video clip from among the located video clips of the identified caller, and playing the selected video clip during consecutive alerts of the incoming call.

In another aspect, the subject matter described in this specification can be implemented in a system including data storage configured to host a digital image library. The system also includes a mobile telecommunications device communicatively coupled with the data storage. The mobile telecommunications device includes a display screen, memory configured to host a contact database, and one or more processors. The one or more processors are configured to perform operations including identifying a caller associated with an incoming call from an originating telecommunications device based on contact info included in the contact database hosted on the memory. The contact info includes a contact path and a photo associated with each contact. The one or more processors are configured to perform operations including determining whether the digital image library hosted on the data storage includes a plurality images associated with the caller. If a result of the determination is positive, the one or more processors are configured to randomly display on the display screen one or more of the plurality of the identified caller's images determined in the digital image library, otherwise if the result of the determination is negative, the one or more processors are configured to display the caller's photo corresponding to the contact info.

In another aspect, the subject matter described in this specification can be implemented in a computer storage medium encoded with a computer program. The program includes instructions that when executed by a data processor of a mobile telecommunications device cause the data processor to perform operations including identifying a caller associated with an incoming call from an originating telecommunications device. The operations further include locating plurality images of the identified caller, and randomly displaying on the mobile telecommunications device's display screen one or more of the located plurality images of the identified caller.

Particular implementations of the subject matter described in this specification can be configured so as to realize one or more of the following advantages. Multiple images of a caller associated with an incoming call can be selected such that different images of the caller are presented during consecutive call-alerts, for instance. In addition, the identified caller's image to be displayed can be related to the caller's or call recipient's current location, such that the call recipient can recall memories of the caller from the corresponding location. Additionally the identified caller's image to be displayed can be related to the caller's current daytime, for example, if the incoming call is initiated after sunset at the caller's location, a night-photo of the caller may be displayed on the receiving mobile telecommunications device's display screen.

Details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
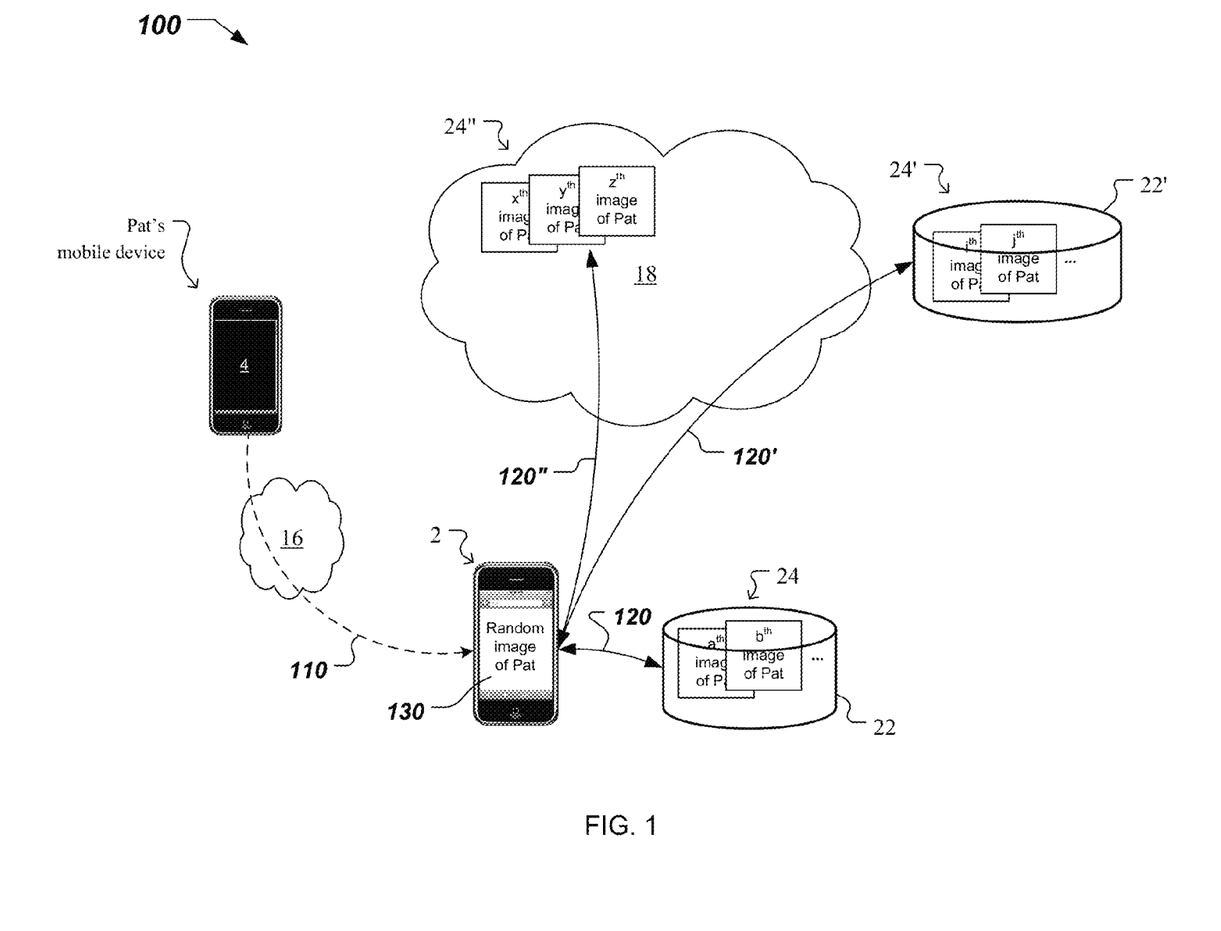
FIG. 1 is a block diagram of an example system and method for selecting an image of a caller associated with an incoming call from a pool of images of the caller.

FIG. 1 is a block diagram of an example system and method 100 for selecting an image of a caller associated with an incoming call from a pool of images of the caller. The system includes mobile telecommunication devices 2 and 4 which are communicatively coupled through a communications network 16. The mobile telecommunication device 2 is configured to directly access local data storage 22, to access network storage 22' through the Internet 18, and to access cloud storage on the Internet 18. The mobile telecommunication devices 2 and 4 can be smartphones, tablet computers, laptops, and the like. The communications network 16 can be a cellular telecommunications network or can be the Internet 18. The incoming call can represent either a voice communication or data communication.

The method 100 can be performed by one or more processes executing on the mobile telecommunication device 2. The method 100 includes identifying 110 a caller associated with an incoming call from the originating telecommunications device 4. In this example, the caller associated with the income call is identified as Pat. The identification can be performed based on information included in a contacts database hosted by the mobile telecommunications device 2, as described in detail in connection with FIG. 2.

The method 100 further includes locating 120, 120', 120'' a plurality of images 24, 24', 24'' of the identified caller. In general, images of Pat can located at multiple locations. In some implementations, the plurality of images 24 of the identified caller can be located by searching 120 a first image database 22 located on the mobile telecommunication device 2. For example, a local query executed by the mobile telecommunications device 2 can identify Pat's images "a", "b", . . . , 24 stored on the data storage 22 local to the mobile telecommunications device 2. In some implementations, the plurality of images 24' of the identified caller can be located by searching 120' a second image database 22' located on a network server system. For example, a network query launched by the mobile telecommunications device 2 can identify Pat's images "i", "j", . . . , 24' stored on the data storage 22' located on a network server of an internet service provider, of a social networking site, and the like. In some implementations, the plurality of images 24'' of the identified caller can be located by searching the World Wide Web 18. For example, an Internet search engine query launched by the mobile telecommunications device 2 can identify Pat's images "x", "y", "z", . . . , 24'' publicly posted somewhere on the Internet 18.

Furthermore, the method 100 includes randomly displaying 130 on the mobile telecommunications device 2's display screen one or more of the located plurality images of the identified caller. Additionally, the presentation 130 of the one or more randomly selected images can be in the form of a collage or a slide show animation. As described in detail below in connection with FIGS. 2, 3A-3B and 4, Pat's located images can be filtered based on predetermined criteria, prior to randomly selecting one or more of Pat's images from a set of filtered images, and then displaying the randomly selected images.

Figure 2:
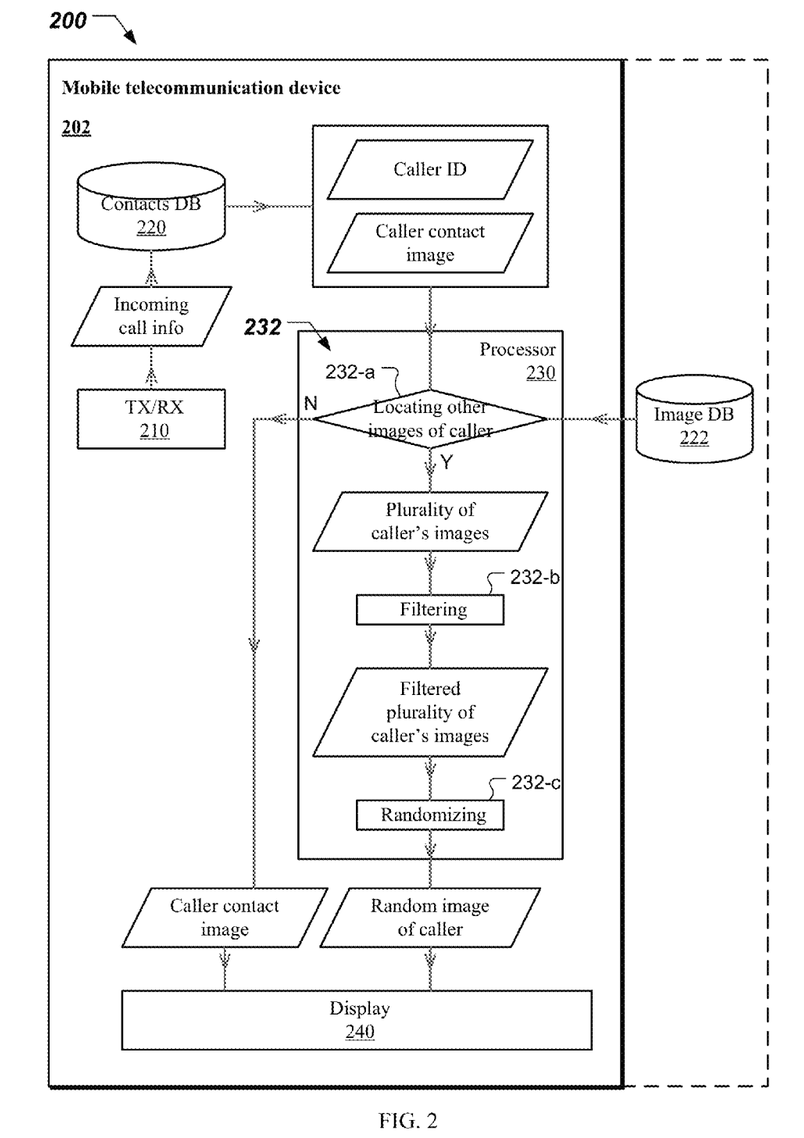
FIG. 2 is a block diagram of an example apparatus and method for selecting an image of a caller associated with an incoming call between the caller's image from a contact database and a pool of images of the caller stored in another image database.

FIG. 2 is a block diagram of a system 200 and method 232 for selecting an image of a caller associated with an incoming call. The selecting is between the caller's image from a contacts database and a pool of images of the caller stored in another image database. The system 200 includes a data storage 222 configured to host a digital image library. Additionally, the system 200 includes a mobile telecommunication device 202 communicatively coupled with the data storage 222. In some implementations, the data storage 222 is included in the mobile telecommunication device 202. The mobile telecommunication device 202 includes a transceiver (TX/RX) 210, memory 220 configured to host a contacts database, at least one processor 230, and a display screen 240.

The mobile telecommunication device 202 can receive an incoming call using the transceiver 210. The incoming call can be a voice communication, a text communication, and the like. The processor 230 can check incoming call information against information stored in the contacts database 220 to determine the caller's identity. In some implementations, the incoming call information includes at least a unique contact path identifier of a telecommunication device that originated the call. For example, the unique contact path identifier can be a phone number. The processor 230 can match the unique contact path identifier associated with the incoming call to corresponding caller ID and to a caller contact image stored in the contacts database 220. The caller ID represents one or more of a name, nickname, and the like, associated with the unique contact path identifier. The caller contact image represents a photo associated with the unique contact path identifier.

The processor 230 is configured to select between the identified caller's contact image from the contacts database 220 and a pool of images of the identified caller stored in another image database 222. Further, the processor 230 is configured to present the selected image of the identified caller onto the display screen 240. A method 232 can be implemented by the processor 230 to execute the foregoing selection.

The method 232 includes locating 232-a other images of the identified caller. Locating 232-a other images of the identified caller includes a determination whether a digital image library hosted by the image DB 222 includes a plurality of images associated with the identified caller. In some implementations, to determine whether the digital image library 222 includes a plurality images associated with the identified caller, the processor 230 is configured to query the image database 222 based on the caller ID. As described above, the caller ID can include one or more of an identifier of the originating telecommunication device (e.g., incoming phone number,) a name of the identified caller, and a nickname of the identified caller. In some implementations, to determine whether the digital image library 222 includes a plurality of images associated with the identified caller, the processor 230 is configured to match images from the image database 222 with the identified caller's contact image associated with the contacts database 220.

If a result of the determination is positive (232-a, Y,) the method 232 can optionally include filtering 232-b the located plurality of the identified caller's images based on predetermined filtering criteria. By filtering 232-b the located other images of the identified caller, the processor 230 can randomly select an identified caller's image for display from a smaller pool of images that may be related to an event type, a location, and the like, as described in detail below in connection with FIGS. 3A-3B. In some implementations of the filtering 232-b, the processor 230 is further configured to assign respective confidence levels to the located plurality of the identified caller's images. Accordingly, prior to displaying the randomly selected image of the identified caller, the processor 230 is configured to determine images from among the located plurality of the identified caller's images that have respective confidence levels higher than or equal to a predetermined confidence level.

The method 323 continues with the processor 230 randomizing 232-c the filtered plurality of identified caller's images to obtain a random image of the identified caller for display. Randomizing 232-c includes selecting an image from the filtered plurality of identified caller's images based on a random or pseudo-random number generator. In some implementations, the processor 230 is configured to randomly select 232-c two or more images from the filtered plurality of identified caller's images.

Finally, the processor 230 is configured to display the randomly selected one or more images of the identified caller from the digital image library 222 onto the display screen 240. However, if the result of the determination is negative (232-a, N,) the processor 230 is configured to display the identified caller's contact image from the contacts DB 220.

Figure 3A:
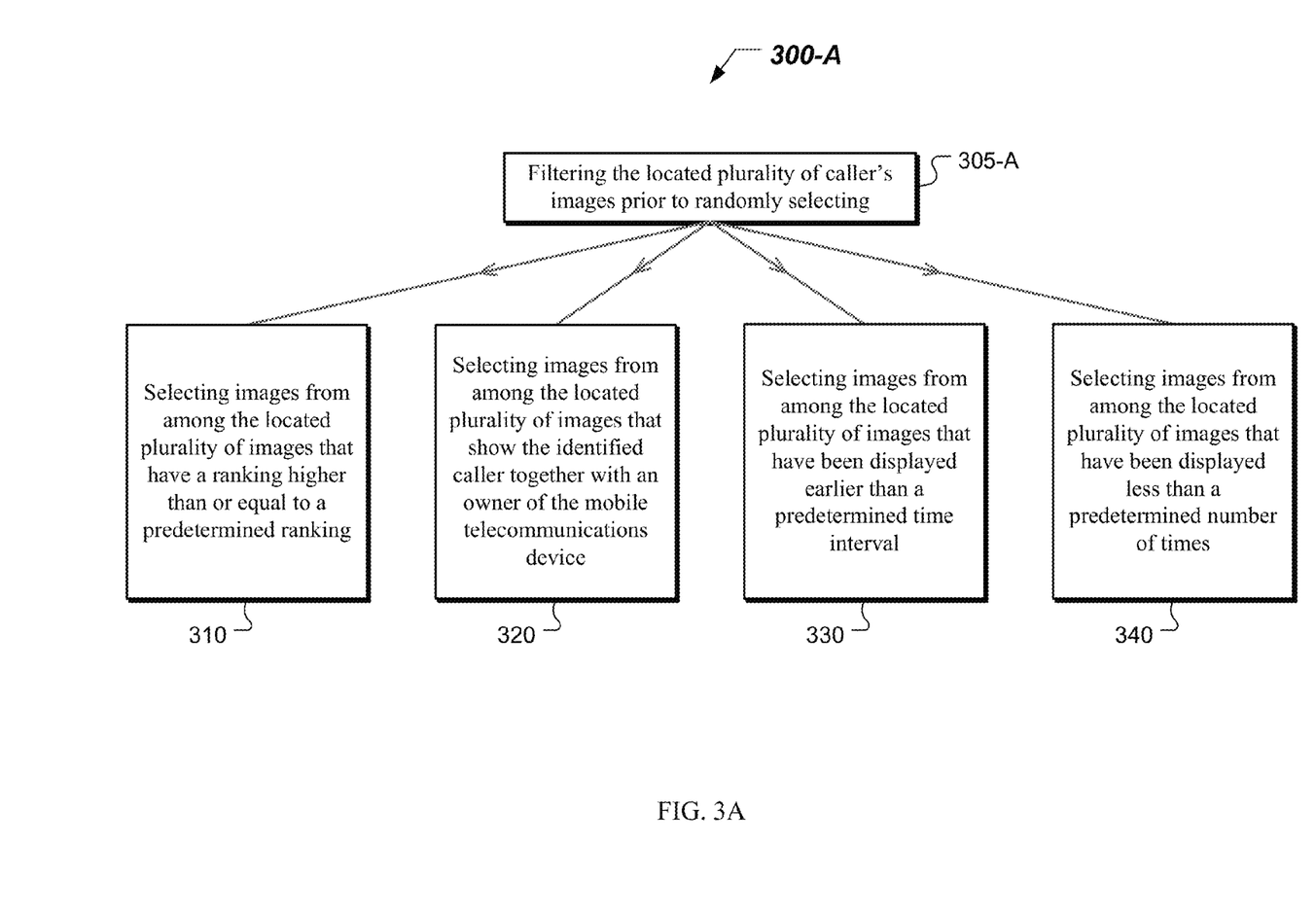
FIGS. 3A-3B show examples of methods for filtering a located plurality of caller's images prior to randomly selecting one or more images from the plurality.

FIG. 3A shows an example of a method 300-A for filtering 305-A a located plurality of a caller's images prior to randomly selecting one or more images from the plurality. The method 300-A can be combined with method 232 described in connection with FIG. 2, for instance.

In some implementations, filtering 305-A the located plurality of caller's images can include selecting 310 images from among the located plurality of images that have a ranking higher than or equal to a predetermined ranking. For example, images in a library of digital images 222 can be ranked on a star-system by a user associated with the library 222. As another example, images in a library of digital images 222 can be automatically ranked highly if the images have been used a lot (sent in email, used on desktop, in collages, etc.) or if the images were published publicly and many people have commented on them. Additionally, pictures can be automatically ranked highly if specialized software determines that the pictures have good range of color, are in focus, have a focus in the center of the respective frames, and the like.

In some implementations, filtering 305-A the located plurality of caller's images can include selecting 320 images from among the located plurality of images that show the identified caller together with an owner of the mobile telecommunications device. For example referring to FIG. 1, metadata associated with the located plurality of images can include information relating to identified faces of Pat (the identified caller) and of the device 2' owner. As another example referring to FIG. 1, Pat's contact image can be used first to locate images depicting Pat's face, then the device owner's picture can be used to filter the located images depicting Pat's face to images depicting both Pat's and the device owner's faces.

In some implementations, filtering 305-A the located plurality of caller's images can include selecting 330 images from among the located plurality of images that have been displayed earlier than a predetermined time interval. For example referring to FIG. 1, the located images of Pat can be filtered to images that have not been displayed during the last 30 days (or since yesterday, or the like.)

In some implementations, filtering 305-A the located plurality of caller's images can include selecting 340 images from among the located plurality of images that have been displayed less than a predetermined number of times. For example referring to FIG. 1, the located images of Pat can be filtered to images that have not been yet displayed. As another example referring to FIG. 1, method 300-A can include selecting 340 from among the located images of Pat the images that have been presented less than a median (50-percentile) number of times, or less then a 25-percentile number of times, or the like.

Figure 3B:
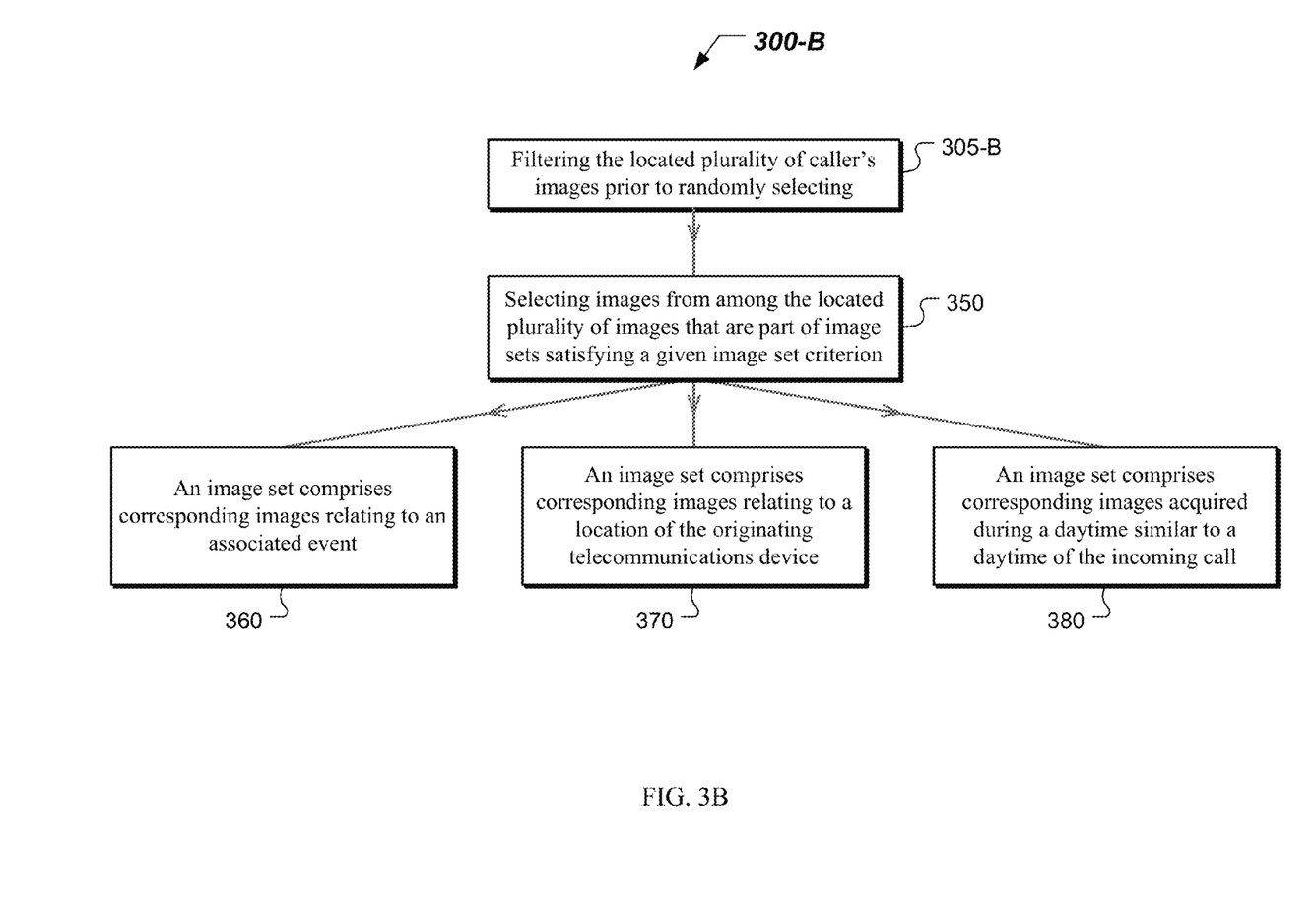

FIG. 3B shows another example of a method 300-B for filtering 305-B a located plurality of caller's images prior to randomly selecting one or more images from the plurality. The method 300-B can be combined with method 232 described in connection with FIG. 2, for instance. Filtering 305-B the located plurality of caller's images can include selecting 350 images from among the located plurality of images that are part of image sets satisfying a given image set criterion.

In some implementations, an image set can include 360 corresponding images relating to an associated event. The associated event can be a wedding, a birthday party, summer camp, and the like. For example referring to FIG. 1, method 300-B can include selecting from among the located images of Pat a set of images taken during Pat's wedding. As another example referring to FIG. 1, method 300-B can include selecting from among the located images of Pat a set of images taken at Pat's past birthday parties, and the like.

In some implementations, an image set can include 370 corresponding images relating to a geo-location of the originating telecommunications device. Referring to FIG. 2, the received incoming call information may include the current geo-location of the originating telecommunication device. For example, if the incoming call is placed from a home phone (e.g., landline,) the geo-location of the home phone can be extracted from a home address information stored in the contact database 220. As another example, if the incoming call is placed from a smart phone equipped with a global positioning system module, an accurate geo-location of the smart phone can be obtained as part of the received incoming call information. For example referring to FIG. 1, when the incoming call information includes an indication that Pat's call originated in San Francisco, method 300-B can include selecting from among the located images of Pat a set of images taken during Pat's previous trips to San Francisco. Alternatively, an image set can include 370 corresponding images relating to a geo-location of the call recipient's telecommunications device. For example referring again to FIG. 1, when the incoming call from Pat originated at home in Austin and the call recipient is on travel in New York City, method 300-B can include selecting from among the located images of Pat a set of images taken during Pat's previous trips to New York City.

In some implementations, an image set can include 380 corresponding images acquired during a daytime similar to a daytime of the incoming call. For example, a time of the call can be used to select for display from among the located images an image of the identified caller captured at night if the incoming call is at night, or an image of the identified caller captured during daylight if the incoming call is not at night. Additionally, the date/season of the call can be used to select for display from among the located images an image of the identified caller captured during a same season as the current season. For example referring to FIG. 1, when Pat's incoming call is received in December, method 300-B can include selecting from among the located images of Pat a set of Winter Holiday pictures.

Figure 4:
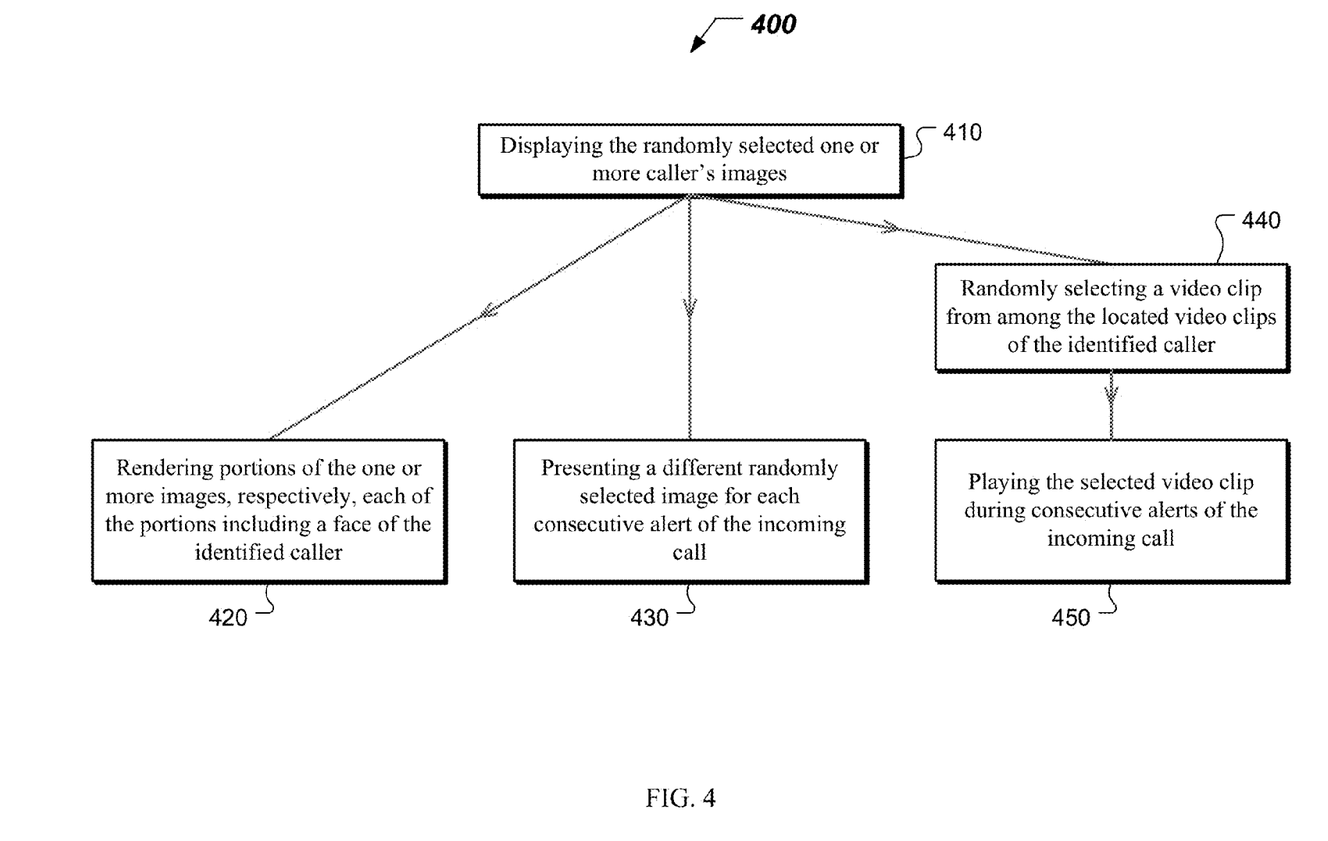
FIG. 4 shows an example of a method for displaying the randomly selected one or more caller's images.

FIG. 4 shows an example of a method 400 for displaying 410 the randomly selected one or more images of the identified caller. The method 400 can be combined with method 100 described in connection with FIG. 1, and/or with method 232 described in connection with FIG. 2, for instance.

In some implementations, the displaying 410 can include rendering 420 portions of the one or more images, respectively, each of the portions including a face of the identified caller. For example referring to FIG. 1, method 400 can include cropping Pat's face from a randomly selected image that depicts Pat standing, and rendering 420 only the cropped face onto the display screen of the mobile telecommunication device 2.

In some implementations, displaying 410 can include presenting 430 a different image for each consecutive alert of the incoming call. For example referring to FIG. 1, method 400 can include presenting 430 a slide show animation of Pat's randomly selected images such that switching between successive images is based on timing of an incoming call alerts. For instance, a first image of Pat is shown during the first ring, a second image of Pat is shown during the second ring, and so on.

In some instances, the located plurality of images of the identified caller can include video clips of the identified caller. In such instances, displaying 410 the randomly selected one or more caller's images includes randomly selecting 440 a video clip from among the located video clips of the identified caller, and then playing 450 the selected video clip during consecutive alerts of the incoming call. For example referring to FIG. 1, method 400 can include playing 450 3-4 seconds of a first video clip depicting Pat, then switching to play 3-4 seconds of a second video clip depicting Pat, and so on.

A multitude of computing devices may be used to implement the systems and methods described in this document, as either a client or as a server or plurality of servers. A computing device can be implemented in various forms of digital computers, such as laptops, desktops, workstations, personal digital assistants, servers, blade servers, mainframes, and other appropriate computers. Another computing device can be implemented in various forms of mobile devices, such as personal digital assistants, cellular telephones, smartphones, and other similar computing devices. Additionally, computing devices can include Universal Serial Bus (USB) flash drives. The USB flash drives may store operating systems and other applications. The USB flash drives can include input/output components, such as a wireless transmitter or USB connector that may be inserted into a USB port of another computing device. The components described here, their connections and relationships, and their functions, are meant to be exemplary only, and are not meant to limit implementations of the inventions described and/or claimed in this document.

A computing device can include a processor, memory, a storage device, a high-speed interface connecting to memory and high-speed expansion ports. The computing device can further include a low speed interface connecting to a low speed bus and a storage device. Each of the above components can be interconnected using various busses, and may be mounted on a common motherboard or in other manners as appropriate. The processor can process instructions for execution within the computing device, including instructions stored in the memory or on the storage device to display graphical information for a GUI on an external input/output device, such as a display coupled to high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory can store information within the computing device. In one implementation, the memory can be a volatile memory unit or units. In another implementation, the memory can be a non-volatile memory unit or units. The memory may also be another form of computer-readable medium, such as a magnetic or optical disk.

The storage device can provide mass storage for the computing device. In one implementation, the storage device may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory, the storage device, or memory on processor.

The high speed controller can manage bandwidth-intensive operations for the computing device, while the low speed controller can manage lower bandwidth-intensive operations. Such allocation of functions is exemplary only. In one implementation, the high-speed controller can be coupled to memory, to a display (e.g., through a graphics processor or accelerator), and to high-speed expansion ports, which may accept various expansion cards. In the implementation, low-speed controller can be coupled to the storage device and the low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device may be combined with other components in a mobile device. Each of such devices may contain one or more computing devices or mobile devices, and an entire system may be made up of multiple computing devices and mobile devices communicating with each other.

A mobile device can include a processor, memory, an input/output device such as a display, a communication interface, and a transceiver, among other components. The mobile device may also be provided with a storage device, such as a microdrive or other device, to provide additional storage. Each of the above components is interconnected using various buses, and several of the components may be mounted on a common motherboard or in other manners as appropriate.

The processor can execute instructions within the mobile device, including instructions stored in the memory. The processor of the mobile device may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the mobile device, such as control of user interfaces, applications run by the mobile device, and wireless communication by the mobile device.

The processor of the mobile device may communicate with a user through control interface and display interface coupled to a display. The display may be, for example, a Thin-Film-Transistor Liquid Crystal display or an Organic Light Emitting Diode display, or other appropriate display technology. The display interface may include appropriate circuitry for driving the display to present graphical and other information to a user. The control interface may receive commands from a user and convert them for submission to the processor of the mobile device. In addition, an external interface may provide in communication with processor of the mobile device, so as to enable near area communication of the mobile device with other devices. The external interface may provide, for example, for wired communication in some implementations, or for wireless communication in other implementations, and multiple interfaces may also be used.

The memory stores information within the computing mobile device. The memory can be implemented as one or more of a computer-readable medium or media, a volatile memory unit or units, or a non-volatile memory unit or units. An expansion memory may also be provided and connected to the mobile device through an expansion interface, which may include, for example, a SIMM (Single In Line Memory Module) card interface. Such expansion memory may provide extra storage space for the mobile device, or may also store applications or other information for the mobile device. Specifically, expansion memory may include instructions to carry out or supplement the processes described above, and may include secure information also. Thus, for example, expansion memory may be provide as a security module for the mobile device, and may be programmed with instructions that permit secure use of device. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory, expansion memory, or memory on processor that may be received, for example, over transceiver or external interface.

The mobile device may communicate wirelessly through communication interface, which may include digital signal processing circuitry where necessary. Communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as using a Bluetooth, WiFi, or other such transceiver (not shown). In addition, GPS (Global Positioning System) receiver module may provide additional navigation- and location-related wireless data to the mobile device, which may be used as appropriate by applications running on the mobile device.

The mobile device may also communicate audibly using audio codec, which may receive spoken information from a user and convert it to usable digital information. Audio codec may likewise generate audible sound for a user, such as through a speaker, e.g., in a handset of the mobile device. The sound may include sound from voice telephone calls, may include recorded sound (e.g., voice messages, music files, etc.) and may also include sound generated by applications operating on the mobile device.

The mobile computing device may be implemented in a number of different forms. For example, it may be implemented as a cellular telephone. It may also be implemented as part of a smartphone, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A telecommunications device comprising:
  a display screen;
  memory hosting a contact database and a computer program; and
  one or more processors communicatively coupled with a data storage hosting a digital image library,
  wherein the computer program includes instructions that when executed by the one or more processors causes the telecommunications device to perform operations comprising:
    identifying a caller associated with an incoming call from an originating telecommunications device based on contact info comprised in the contact database hosted on the memory, wherein the contact info includes a photo associated with each contact;
    determining that the digital image library hosted on the data storage includes a plurality of the identified caller's images that are different from the caller's photo corresponding to the caller's contact info;
    assigning respective confidence levels to the identified caller's images in the digital image library;
    selecting images from among the plurality of the identified caller's images in the digital image library that have respective confidence levels higher than or equal to a predetermined confidence level; and
    displaying on the display screen one or more of the selected images.

2. The telecommunications device of claim 1, wherein the data storage hosting the digital image library is located on the telecommunications device.

3. The telecommunications device of claim 1, wherein the data storage hosting the digital image library is located on a remote server system.

4. The telecommunications device of claim 1, wherein the operation of determining whether the digital image library includes the plurality of the identified caller's images comprises matching images from the digital image library with the caller's photo corresponding to the contact info.

5. The telecommunications device of claim 1, wherein the images are randomly selected from among a subset of the identified caller's images in the digital image library that have a ranking higher than or equal to a predetermined ranking.

6. The telecommunications device of claim 1, wherein the images are randomly selected from among a subset of the identified caller's images in the digital image library that show the identified caller together with an owner of the telecommunications device.

7. The telecommunications device of claim 1, wherein the images are randomly selected from among a subset of the identified caller's images in the digital image library that have been displayed earlier than a predetermined time interval.

8. The telecommunications device of claim 1, wherein the images are randomly selected from among a subset of the identified caller's images in the digital image library that have been displayed less than a predetermined number of times.

9. The telecommunications device of claim 1, wherein the images are randomly selected from among a subset of the identified caller's images in the digital image library that relate to an associated event.

10. The telecommunications device of claim 1, wherein the images are randomly selected from among a subset of the identified caller's images in the digital image library that relate to a location of the originating telecommunications device.

11. The telecommunications device of claim 1, wherein the images are randomly selected from among a subset of the identified caller's images in the digital image library that are acquired during a daytime similar to a daytime of the incoming call.

12. The telecommunications device of claim 1, wherein the operation of displaying the one or more selected images comprises rendering portions of the one or more selected images, respectively, each of the portions including a face of the identified caller.

13. The telecommunications device of claim 1, wherein the operation of displaying the one or more selected images comprises displaying a different image for each consecutive alert of the incoming call.

14. The telecommunications device of claim 1, wherein
the plurality of identified caller's images comprise video clips of the identified caller, and
the operation of selecting images from among the plurality of identified caller's images comprises randomly selecting a video clip from among the video clips of the identified caller; and
the operation of displaying the one or more selected images comprises playing the selected video clip during consecutive alerts of the incoming call.

15. A method comprising:
storing a contact database on a memory of a mobile device;
establishing, by one or more processors of the mobile device, a communication with a data storage hosting a digital image library;
identifying, by the one or more processors, a caller associated with an incoming call from an originating telecommunications device based on contact info comprised in the contact database stored on the memory, wherein the contact info includes a photo associated with each contact;
determining, by the one or more processors, that the digital image library hosted on the data storage includes a plurality of the identified caller's images that are different from the caller's photo corresponding to the caller's contact info;
assigning, by the one or more processors, respective confidence levels to the identified caller's images in the digital image library;
selecting, by the one or more processors, images from among the plurality of the identified caller's images in the digital image library that have respective confidence levels higher than or equal to a predetermined confidence level; and
displaying one or more of the selected images on a display screen of the mobile device.

16. The method of claim 15, wherein the data storage hosting the digital image library is located on the telecommunications device.

17. The method of claim 15, wherein the data storage hosting the digital image library is located on a remote server system.

18. The method of claim 15, wherein said determining whether the digital image library includes the plurality of the identified caller's images comprises matching images from the digital image library with the caller's photo corresponding to the contact info.

19. The method of claim 15, wherein said selecting the images is performed by randomly selecting the images from among a subset of the identified caller's images in the digital image library that have a ranking higher than or equal to a predetermined ranking.

20. The method of claim 15, wherein said selecting the images is performed by randomly selecting the images from among a subset of the identified caller's images in the digital image library that show the identified caller together with an owner of the telecommunications device.

21. The method of claim 15, wherein said selecting the images is performed by randomly selecting the images from among a subset of the identified caller's images in the digital image library that have been displayed earlier than a predetermined time interval.

22. The method of claim 15, wherein said selecting the images is performed by randomly selecting the images from among a subset of the identified caller's images in the digital image library that have been displayed less than a predetermined number of times.

23. The method of claim 15, wherein said selecting the images is performed by randomly selecting the images from among a subset of the identified caller's images in the digital image library that relate to an associated event.

24. The method of claim 15, wherein said selecting the images is performed by randomly selecting the images from among a subset of the identified caller's images in the digital image library that relate to a location of the originating telecommunications device.

25. The method of claim 15, wherein said selecting the images is performed by randomly selecting the images from among a subset of the identified caller's images in the digital image library that are acquired during a daytime similar to a daytime of the incoming call.

26. The method of claim 15, wherein said displaying the one or more selected images is performed by rendering portions of the one or more selected images, respectively, each of the portions including a face of the identified caller.

27. The method of claim 15, wherein said displaying the one or more selected images is performed by displaying a different image for each consecutive alert of the incoming call.

28. The method of claim 15, wherein
the plurality of identified caller's images comprise video clips of the identified caller, and
said selecting images from among the plurality of identified caller's images is performed by randomly selecting a video clip from among the video clips of the identified caller; and
said displaying the one or more selected images is performed by playing the selected video clip during consecutive alerts of the incoming call.

* * * * *